US006946524B2

(12) United States Patent
Breuer et al.

(10) Patent No.: US 6,946,524 B2
(45) Date of Patent: Sep. 20, 2005

(54) METHODS FOR PRODUCING POLYESTER AMIDES BASED ON POLYISOBUTYLENES, POLYESTER AMIDES PRODUCED THEREBY, AND USES THEREFOR IN STABILIZING CRUDE OIL

(75) Inventors: Wolfgang Breuer, Korschenbroich (DE); Paul Birnbrich, Solingen (DE); Claus-Peter Herold, Mettmann (DE); Stephan Von Tapavicza, Erkrath (DE); Didier Groffe, Manosque (FR); Matthias Hof, Duisburg (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 20 days.

(21) Appl. No.: 10/363,451

(22) PCT Filed: Aug. 29, 2001

(86) PCT No.: PCT/EP01/09944

§ 371 (c)(1), (2), (4) Date: Aug. 4, 2003

(87) PCT Pub. No.: WO02/18454

PCT Pub. Date: Mar. 7, 2002

(65) Prior Publication Data

US 2004/0039125 A1 Feb. 26, 2004

(30) Foreign Application Priority Data

Sep. 1, 2000 (DE) ........................................ 100 43 080

(51) Int. Cl.[7] ........................... C08F 8/32; C08F 255/00

(52) U.S. Cl. .................... 525/242; 525/284; 525/326.1; 525/327.9; 528/480; 528/492

(58) Field of Search ................................ 525/242, 284, 525/326.1, 327.9; 528/480, 492, 271, 272, 310, 372, 288

(56) References Cited

U.S. PATENT DOCUMENTS 3,531,440 A * 9/1970 Lindstrom et al. ....... 525/327.9
3,865,792 A * 2/1975 Lee ............................ 528/341
4,121,026 A 10/1978 Cheng et al.
4,414,035 A 11/1983 Newberry et al.
4,439,565 A * 3/1984 Winter et al. ............... 524/103
5,006,581 A * 4/1991 Nakane et al. .............. 524/266
5,268,445 A * 12/1993 Gaymans et al. ........... 528/272
5,523,358 A * 6/1996 Hirose et al. ............... 525/244
5,788,722 A 8/1998 Emert et al.
5,976,202 A 11/1999 Rath et al.
6,180,683 B1 1/2001 Miller et al.
6,368,422 B1 * 4/2002 Breuer et al. ................. 134/40
6,512,055 B2 * 1/2003 Gunther et al. ............. 525/285
6,630,541 B1 * 10/2003 Bakker et al. .............. 525/425
2004/0039125 A1 * 2/2004 Breuer et al. ............... 525/242

OTHER PUBLICATIONS

Falbe, et al., ROMPP, Chemielaxikon, vol. 2, Georg Thieme Verlag, Stuttgart, New York, (1997), pp. 1210–1213.

E. Y. Sheu & O. C. Mullins (eds.), Asphaltenes: Fundamentals and Applications, Plenum Press, New York, (1995), Chapter 1, pp. 1–52.

E. Y. Sheu & O. C. Mullins (eds.), Asphaltenes: Fundamentals and Applications, Plenum Press, New York, (1995), Chapter 3, pp. 97–130.

* cited by examiner

*Primary Examiner*—P. Hampton Hightower
(74) *Attorney, Agent, or Firm*—Heslin Rothenberg Farley & Mesiti P.C.

(57) ABSTRACT

Processes for producing polyester amides, by reacting a polyisobutylene with a first reagent selected from the group consisting of at least monounsaturated acids having from 3 to 21 carbon atoms and derivatives thereof; and a second reagent selected from the group consisting of monoethanolamine and alkylamines of the general formula $R—NH_2$, wherein R represents an alkyl group having from 1 to 4 carbon atoms; are described. The polyester amides thus produced and their uses in stabilizing asphaltenes in crude oil and crude oil derivatives are also described.

14 Claims, No Drawings

METHODS FOR PRODUCING POLYESTER AMIDES BASED ON POLYISOBUTYLENES, POLYESTER AMIDES PRODUCED THEREBY, AND USES THEREFOR IN STABILIZING CRUDE OIL

BACKGROUND OF THE INVENTION

Crude oil is a complex mixture of various paraffinic and aromatic hydrocarbons in which the individual constituents have very different chemical and physical properties. Accordingly both readily volatile, low-viscosity constituents and wax-like, high-viscosity fractions are obtained in the distillation of crude oil. The second of these two groups includes petroleum resins and, to a predominant extent, asphaltenes which are colloidally dispersed in the oil phase.

The asphaltenes consist of a mixture of various saturated, unsaturated and aromatic hydrocarbons, more particularly naphthalene derivatives. Besides these, there are also found heterocyclic hydrocarbons which, in part, also contain complexed metal ions. In addition, asphaltenes are rich in sulfur, nitrogen and oxygen compounds. Because of their complex composition, asphaltenes are generally characterized on the basis of their solubility. Thus, the petroleum fraction insoluble in heptane or pentane, but soluble in toluene is referred to as asphaltenes, the "dissolution" of asphaltenes involving a complex process for which there has as yet been no complete theoretical explanation (cf. E. Y. Sheu, O. C. Mullins, *Asphaltenes— Fundamentals and Applications*, Plenum Press, New York, 1995,Chapter I and Chapter III).

Asphaltenes are present as micelle colloids in the oil phase of crude oil, the individual micelles consisting of several different molecules. The micelles vary in size according to the temperature and composition of the oil phase. For example, it is known that relatively light aromatic hydrocarbons in crude oil stabilize the asphaltene micelles. Under the conditions prevailing in petroleum production or recovery, however, the asphaltenes are often precipitated, which results in the formation of highly viscous, wax-like or solid residues on the surface of the production units and the petroleum-containing formation surrounding the well. The asphaltene residues block the pores of the formation, which leads to a noticeable reduction in the production rates and, in the worst case, can make production completely impossible. Asphaltene residues on the surfaces of the production units, for example the delivery tube or the casing walls of pipelines or separators, can also considerably reduce production.

Accordingly, there are various known methods for keeping asphaltenes dispersed in crude oil and for preventing their precipitation. In this regard, DE 197 09 797 describes synergistic mixtures of alkylphenol-formaldehyde resins and certain alkoxylated amines as asphaltene dispersants. It is known from U.S. Pat. No. 4,414,035 that alkylarylsulfonic acid derivatives, for example dodecylbenzenesulfonic acid, are suitable for dispersing asphaltenes in crude oils.

However, it has often been found in practice that known auxiliaries for stabilizing asphaltenes differ very considerably in their effectiveness according to the nature and origin of the crude oil. This is attributable in particular to the complex and highly variable structure of the asphaltenes. Accordingly, efforts have been made to find new asphaltene stabilizers. In addition, asphaltene stabilizers known in the prior art are often either toxic and/or ecologically unsafe. Both for reasons of environmental compatibility of operating media and in the interests of safety at work, attempts are therefore being made to avoid using such substances.

Accordingly, the problem addressed by the present invention was to provide effective alternatives to the stabilizers known from the prior art for stabilizing asphaltenes in crude oils, even for very different crude oil grades. It has been found that certain polyester amides solve this problem.

BRIEF SUMMARY OF THE INVENTION

The present invention relates, in general, to certain polyester amides, to a process for their production, to their use for stabilizing asphaltenes in crude oil and to a process for preventing the precipitation of asphaltenes in crude oils.

In a first embodiment, the present application relates to polyester amides obtainable by a two-stage reaction in which (A) polyisobutylene is reacted with at least monounsaturated acids containing 3 to 21 carbon atoms or derivatives thereof, preferably carboxylic anhydrides thereof, for at least 3 h, ither (A.1) in the presnce of radical initiators at temperatures of 65 to 100° C. or (A.2) without radical initiators, but optionally in the presence of Lewis acids, at 150 to 250° C., and in the second step (B) an alkylamine with the general formula R—$NH_2$, in which R is an alkyl group containing 1 to 4 carbon atoms, is added to the product thus obtained and the mixture is stirred at 60 to 100° C. and then cooled and the end product is isolated in known manner.

DETAILED DESCRIPTION OF THE INVENTION

The polyester amides according to the invention are based on polyisobutylene, a raw material known to the expert which is industrially obtained by polymerization of isobutylene. Particulars of the production and properties of this class of compounds can be found in Ullmanns Encyclopedia of Industrial Chemistry, Sixth Edition, 2000 Electronic Release—Butenes—Chemical Properties. The polyisobutylenes have molecular weights of 500 to 50,000, preferably in the range from 1,000 to 25,000 and more preferably in the range from 1,500 to 15,000. Beside pure isobutylene, it may also be preferred to use copolymers which contain at least 50% of isobutylene monomers, and further monomers.

The polyisobutylenes are introduced into a reaction vessel at temperatures of at least 60° C., preferably at temperatures of 65 to 95° C. and more particularly at temperatures of 75 to 85° C. and the unsaturated acids are then added.

These acids or their derivatives are at least monoolefinically unsaturated and preferably contain 3 to 7 carbon atoms. The anhydrides are particularly preferred. A preferred anhydride is maleic anhydride. However, maleic acid or fumaric acid or their esters or acrylic acid, methacrylic acid and derivatives thereof are also suitable components in step (A).

In one variant, the reaction in the first step takes place in the presence of radical initiators, preferably azo-bis-isobutyronitrile (AIBN) and/or other radical initiators known to the expert, for example dibenzoyl peroxides, radical initiators with half lives at 60 to 70° C. of 10 hours being particularly preferred. The following radical initiators are mentioned by name here: dibenzoyl peroxide, tert-amyl peroxy-2-ethylhexanoate, tert-butyl peroxi-2-ethylhexanoate, tert-butyl peroxyisobutyrate and tert-butyl monoperoxymaleate.

Alternatively, it is also possible to work without radical initiators. The reaction according to (A.2) systematically represents an ene reaction, it being possible to carry this out in the presence of catalysts selected from the group of Lewis acids. Suitable Lewis acids are, for example, the bromides of phosphorus and aluminum, the chlorides of boron, aluminum, phosphorus, bismuth, arsenic, iron, zinc and tin. However, it is preferred to work without Lewis acids and to react the reactants polyisobutylene and carboxylic acid directly with one another. The reaction temperature in the case of variant (A.2) is higher than for (A.1), namely in the range from 150 to 250° C.

Preferably, step (A) of the process according to the invention takes place under an inert atmosphere, i.e. for example argon or, preferably, nitrogen. The ratio by weight of polyisobutylene to carboxylic anhydride is preferably in the range from 200:1 to 1:200.Ratios by weight of 100:1 to 1:100 are preferred. Ratios by weight of 5:1 to 20:1 are particularly preferred, ratios by weight of 10:1 to 15:1 being most particularly preferred. The choice of suitable ratios by weight is governed by the molecular weight of the components used and may readily be made by the expert.

The reaction time is at least 3 h at least 60° C. in the case (A.1) or at least 150° C. in the case (A.2), higher temperatures and longer reaction times, for example 4 to 8 h or 5 to 7 h, being preferred. Thereafter, a suitable amine with the formula R—$NH_2$ may be added to the reaction mixture. However, the reaction mixture may also first be freed from unreacted anhydride, preferably by distillation under reduced pressure, and the reaction mixture thus worked up subsequently reacted with the amine at a temperature of at least 50° C. Under the effect of the exothermic reaction of the polyisobutylene/anhydride product with the amine, the temperature in the reaction vessel rises to around 100° C. The mixture containing the end product then cools down again and may then be used without further purification. Process steps (A) and (B) may be carried out in a single reaction stage or in two separate stages either continuously or in batches.

The amines of the formula R—$NH_2$ are known compounds, monoethanolamine preferably being selected. The ratio by weight between polyisobutylene and amine is preferably between 100:1 and 10:1. The range from 75:1 to 10:1 is particularly preferred, the range from 50:1 to 15:1 being most particularly preferred.

The present application also relates to a process for the production of polyester amides in which, in step (A), polyisobutylene is reacted with carboxylic anhydrides for at least 3 hours, either in the presence of radical initiators at temperatures of 65 to 100° C. or without radical initiators, but optionally in the presence of Lewis acids, at 150 to 250° C., and, in step (B), an alkylamine with the general formula R—$NH_2$, in which R is a $C_{1-4}$ alkyl group, is added to the product thus obtained and the mixture is stirred at 60 to 100° C. and then cooled and the product is isolated in known manner.

The polyester amides described in the foregoing are surprisingly effective as asphaltene dispersants. In the context of the present application, asphaltenes are those constituents of crude oil which, according to DIN 51595 (Dec. 1983), precipitate when crude oil is dissolved with 30 times its volume of heptane at 18 to 28° C. and which are soluble in benzene. Asphaltenes can form as solids on the surfaces of production units in petroleum production, production units being understood to be any installations which come into direct contact with the oil. These include, for example, the delivery tube, the well casing and any other oil-carrying pipes, pipelines, tankers or separators, pumps and valves. The surfaces of these production units generally consist of metal, more especially steel. However, production units also include the processing steps of the crude oil after its actual production, for example working up of the crude oil fractions by distillation. Asphaltene residues can also occur in the transport of crude oil through pipelines and during its storage and can thus impede production. Solid asphaltene residues are also formed on the surface of the petroleum-containing formation surrounding the well where they block the pores of the rock, resulting in a noticeable reduction in output.

Crude oil is understood to be the unrefined petroleum coming directly from the ground. This unrefined petroleum consists of complex mixtures of, predominantly, hydrocarbons with densities of 0.65 to 1.02 g/$cm^3$ and calorific values of 38 to 46 MJ/kg. The boiling points of the most important constituents of crude oil are in the temperature range from 50 to 350° C. (cf. Römpp, Chemielexikon, Vol. 2, 1997, pages 1210 to 1213).

The use of the polyester amides in accordance with the invention, i.e. their addition to crude oils, effectively prevents the precipitation of asphaltenes and the formation of residues. In order to prevent the precipitation of asphaltenes, it is of advantage to add the polyester amides to the crude oil in quantities of 50 to 2500 ppm, preferably in quantities of 100 to 1000 ppm and more particularly in quantities of 150 to 500 ppm (active substance). In addition, polyester amides with flash points of at most 80° C. are preferably used. The polyester amides according to the invention can also be used successfully for asphaltene inhibition in crude oil derivatives, so-called fuel, middle distillates or residual fuels.

The present invention also relates to a process for preventing the precipitation of asphaltenes from crude oils and crude oil derivatives, in which polyester amides corresponding to the foregoing description are added to the crude oils as stabilizers in quantities of 100 to 2500 ppm.

The present technical teaching also encompasses the use of the polyester amides in the form of dilute solutions in aromatic solvents, preferably toluene. These dilute solutions contain the polyester amides in quantities of preferably 2 to 50% by weight, more preferably 2 to 20% by weight and most preferably 2 to 15% by weight. Such formulations may also contain other additives, such as corrosion inhibitors or defoamers.

EXAMPLES

Production of the Polyester Amides

Example 1

550 g of polyisobutylene (Glissopal 1000,BASF) were introduced into a reactor at 80° C. and 54 g of maleic anhydride were subsequently added. 6 g of AIBN were added to the two-phase mixture with vigorous stirring. After a reaction time of 5 h at 80° C., 34 g of monoethanolamine were added to the reaction mixture. After the onset of the exothermic reaction, the temperature rose to 100° C. After the temperature had fallen to 80° C., the product according to the invention could be isolated.

Example 2

550 g of polyisobutylene (Glissopal 1300,BASF) were introduced into a reactor at 80° C. and 42 g of maleic anhydride were subsequently added. 6 g of AIBN were added to the two-phase mixture with vigorous stirring. After a reaction time of 5 h at 80° C., 26 g of monoethanolamine were added to the reaction mixture. After the onset of the exothermic reaction, the temperature rose to 100° C. After the temperature had fallen to 80° C., the product according to the invention could be isolated.

Example 3

550 g of polyisobutylene (Glissopal 1000,BASF) were introduced into a reactor at 70° C. and 54 g of maleic anhydride were subsequently added. 6 g of AIBN were added to the two-phase mixture with vigorous stirring. After a reaction time of 5 h at 80 ° C., the unreacted maleic anhydride (30 g) was removed by distillation.

Example 4

0.54 g of monoethanolamine was added at 60° C. to 100 g of the product obtained in Example 3.After a reaction time of 1 h at 60° C., the reaction product was decanted.

Example 5

550 g of polyisobutylene (Glissopal 1300,BASF) were introduced into a reactor at 70° C. and 42 g of maleic anhydride were subsequently added. 6 g of AIBN were added to the two-phase mixture with vigorous stirring at 65° C. After a reaction time of 5 h at 80° C., the unreacted maleic anhydride (17 g) was removed by distillation.

Example 6

0.54 g of monoethanolamine was added at 60° C. to 100 g of the product obtained in Example 5. After a reaction time of 1 h at 60° C., the reaction product was decanted.

Example 7

550 g of polyisobutylene (Napvis 10) were introduced into a reactor under a stream of nitrogen at 200° C. Then, over the course of 3 hours, a total of 56 g of maleic anhydride are added in several portions. The temperature is increased to 210° C., and the mixture is after-reacted at this temperature for 5 hours. The mixture is cooled to 150° C. and passed over a glass suction filter in order to obtain the product of the invention according to (A.2).

Example 8

550 g of polyisobutylene (Napvis 5) were introduced into a reactor under a stream of nitrogen at 200° C. Then, over the course of 3 hours, a total of 69 g of maleic anhydride are added in several portions. The temperature is increased to 210° C., and the mixture is after-reacted at this temperature for 5 hours. The mixture is cooled to 150° C. and passed over a glass suction filter in order to obtain the product of the invention according to (A.2).

Example 9

550 g of polyisobutylene (Napvis 30) were introduced into a reactor under a stream of nitrogen at 200° C. Then, over the course of 3 hours, a total of 41 g of maleic anhydride are added in several portions. The temperature is increased to 210° C., and the mixture is after-reacted at this temperature for 5 hours. The mixture is cooled to 150° C. and passed over a glass suction filter in order to obtain the product of the invention according to (A.2).

Testing of the Dispersing Properties:

The test is based on the fact that asphaltenes are soluble in aromatic hydrocarbons but not in aliphatic hydrocarbons. Accordingly, dispersants can be tested by dissolving the oil or extracted asphaltenes in an aromatic solvent and then adding a nonaromatic solvent to produce a deposit.

Since asphaltenes are dark in color, the size of the deposit can be determined by UV-spectroscopic measurement of the supernatant liquid.

Dispersing Test—Procedure a) A 25% oil solution in toluene is filtered to eliminate impurities.
b) Introduce 9.5 ml of heptane as precipitant for asphaltenes and 0.5 ml of toluene/dispersant mixture (25:1) into a small graduated glass tube holding a good 10 ml and shake thoroughly. This corresponds to a dispersant concentration of 2000 ppm. The quantity of dispersant may be varied as required. Pure toluene is used for blank tests.
c) Introduce 0.1 ml of the filtered oil solution into the glass tube and again shake thoroughly.
d) Leave the whole standing for 2 hours away from any vibration. The precipitated asphaltenes should be able to collect at the bottom of the glass tube.
e) After this time, the volume of sediment is estimated from the graduation, the appearance of the sample as a whole is recorded and 1 ml of the supernatant phase is then carefully taken up in a pipette.
f) The quantity taken up is dissolved in 5 ml of a 99:1 mixture of toluene and triethanolamine and the maximum absorption is measured at 700 nm in a UV spectrometer.

Results

Crude oils of differing grades were tested as described above. The results obtained with a standard prior art dispersant (DSA 900,Anticor) are compared with those achieved with compounds 1 to 6 according to the invention in Tables 1 to 3 below. In order to make the results comparable, the absorption values of the samples were divided by the absorption value of the blank sample (pure solvent), the result being shown in the Tables as relative absorption. The nearer the values are to 1.0, the better the effect of the dispersant was.

TABLE 1

| Dispersant | Venezuela 1 Rel. absorption | Venezuela 2 Rel. absorption | Venezuela 3 Rel. absorption |
|---|---|---|---|
| DSA 900 | 0.72 | 0.78 | 0.77 |
| 1 | 0.77 | 0.81 | 0.81 |
| 2 | 0.82 | 0.86 | 0.83 |
| 3 | — | — | — |
| 4 | — | — | — |
| 5 | 0.81 | 0.85 | 0.81 |
| 6 | 0.83 | — | — |

TABLE 2

| Dispersant | Mexico Rel. absorption | Austria Rel. absorption | Norway Rel. absorption |
|---|---|---|---|
| DSA 900 | 0.63 | 0.47 | 0.76 |
| 1 | 0.76 | 0.47 | 0.66 |
| 2 | 0.76 | 0.54 | 0.76 |
| 3 | — | 0.55 | 0.76 |
| 4 | — | 0.54 | 0.79 |
| 5 | 0.75 | 0.51 | 0.64 |
| 6 | — | 0.47 | 0.64– |

TABLE 3

| Dispersant | Algeria Rel. absorption |
|---|---|
| DSA 900 | 0.63 |
| 1 | 0.63 |

TABLE 3-continued

| Dispersant | Algeria Rel. absorption |
|---|---|
| 2 | — |
| 3 | — |
| 4 | — |
| 5 | 0.68 |
| 6 | 0.71 |

It can be seen that the dispersants according to the invention all achieve better results than the prior art product.

What is claimed is:

1. A process for producing it polyester amide, said process comprising reacting a polyisobutylene having an isobutylene monomer content of at least 50% with:

(a) a first reagent comprising an anhydride of a monounsaturated carboxylic acid having from 3 to 21 carbon atoms in the presence of a radical initiator selected from the group consisting of azo-bis-isobutyronitrile, dibenzoyl peroxide and derivatives thereof, at a temperature of from 65 to 100° C.; and (b) a second reagent comprising monoethanolamine; wherein the polyisobutylene and the first reagent are used in a ratio by weight of from 5:1 to 20:1, wherein the polyisobutylene and the second reagent are used in a ratio by weight of from 100:1 to 10:1, and wherein the reaction with the first reagent and the reaction with the second reagent are carried out in separate stages.

2. A method of stabilizing asphaltenes present in crude oil and crude oil derivatives, said method comprising:

(a) providing a substance selected from the group consisting of crude oil and crude oil derivatives; and (b) combining the substance and a polyester amide prepared by a process comprising reacting a polyisobutylene with: a first reagent selected from the group consisting of at least monounsaturated acids, having from 3 to 21 carbon atoms and derivatives thereof; and a second reagent selected from the group consisting of monoethanolamine and alkylamines of the general formula R—NH2, wherein R represents an alkyl group having from 1 to 4 carbon atoms.

3. A method of stabilizing asphaltenes present in crude oil and crude oil derivatives, said method comprising:

(a) providing a substance selected from the group consisting of crude oil and crude oil derivatives; and (b) combining the substance and a polyester amide prepared by a process to comprising reacting a polyisobutylene having an isobutylene monomer content of at least 50% with a first reagent comprising an anhydride of a monounsaturated carboxylic acid having from 3 to 21 carbon atoms, and a second reagent comprising monoethanolamine, in the presence of a radical initiator selected from the group consisting of azo-bis-isobutryonitrile, dibenzoyl peroxide and derivatives thereof, at a temperature of from 65 to 100° C.;

wherein the polyisobutylene and the first reagent are used in a ratio by weight from 5:1 to 20:1, wherein the polyisobutylene and the second reagent are used in a ratio by weight of from 100:1 to 10:1, and wherein the reaction with the first reagent and the reaction with the second reagent are carried out in separate stages.

4. A method according to claim 2, wherein the reaction with the first reagent and the reaction with the second reagent are carried out in separate stages.

5. A method according to claim 2, wherein the polyisobutylene is reached with the first reagent in the presence of a radical initiator at a temperature of from 65 to 100° C.

6. A method according to claim 2, wherein the polyisobutylene is reached with the first reagent in the presence of a Lewis acid at a temperature of from 150 to 250° C.

7. A method according to claim 2, wherein the first reagent comprises a carboxylic anhydride derivative of the at least monounsaturated acids having from 3 to 21 carbon atoms.

8. A method according to claim 2, wherein the polyisobutylene and the first reagent are used in a ratio by weight of from 5:1 to 20:1.

9. A method according to claim 2, wherein the polyisobutylene and the second reagent are used in a ratio by weight of from 100:1 to 10:1.

10. A method according to claim 2, wherein the first reagent comprises maleic anhydride.

11. A method according to claim 2, wherein the second reagent comprises monoethanolamine.

12. A method according to claim 5, wherein the radical initiator is selected from the group consisting of aza-bis-isobutyronitrile, dibenzoyl peroxide and derivatives thereof.

13. A method according to claim 6, wherein the Lewis acid is selected from the group consisting of boron trifluoride, bromides of phosphorus, bromides of aluminum, and chlorides of boron, aluminum, phosphorus, bismuth, arsenic, iron, zinc or tin.

14. A method according to claim 2, wherein the polyisobutylene further comprises at least one additional monomer, and wherein isobutylene monomer is present in an amount of at least 50% by weight of the polyisobutylene.

* * * * *

UNITED STATES PATENT AND TRADEMARK OFFICE

CERTIFICATE OF CORRECTION

PATENT NO. : 6,946,524 B2 
DATED : September 20, 2005
INVENTOR(S) : Breuer et al.

It is certified that error appears in the above-identified patent and that said Letters Patent is hereby corrected as shown below:

Column 7,
Line 49, delete the word “to” after the word “process”.

Column 8,
Lines 19 and 22, delete the word “reached” and insert the word -- reacted --.

Signed and Sealed this

Eighth Day of November, 2005

JON W. DUDAS
*Director of the United States Patent and Trademark Office*